(12) United States Patent
Swoboda

(10) Patent No.: US 8,966,647 B2
(45) Date of Patent: Feb. 24, 2015

(54) COMPARING CENTRAL TIME STAMP BITS FROM BUS AND CLIENT CIRCUITRY

(71) Applicant: Texas Instruments Incorporated, Dallas, TX (US)

(72) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/044,478

(22) Filed: Oct. 2, 2013

(65) Prior Publication Data

US 2014/0040523 A1 Feb. 6, 2014

Related U.S. Application Data

(62) Division of application No. 12/973,274, filed on Dec. 20, 2010, now abandoned.

(60) Provisional application No. 61/287,951, filed on Dec. 18, 2009.

(51) Int. Cl.
*H04L 29/06* (2006.01)
*G06F 13/40* (2006.01)
*H04L 9/32* (2006.01)

(52) U.S. Cl.
CPC .............. *G06F 13/40* (2013.01); *H04L 9/3297* (2013.01)

USPC ........................................................... 726/26

(58) Field of Classification Search
CPC ............ G06F 21/6245; G06F 21/6254; G06F 21/725; H04L 9/0625
USPC ............... 726/26, 30; 713/178, 500, 600, 601
See application file for complete search history.

(56) References Cited

U.S. PATENT DOCUMENTS 6,680,921 B1 * 1/2004 Svanbro et al. ............... 370/324

* cited by examiner

*Primary Examiner* — Edward Zee
(74) *Attorney, Agent, or Firm* — Lawrence J. Bassuk; Frederick J. Telecky, Jr.

(57) ABSTRACT

This invention is time stamping subsystem of an electronic apparatus. A time stamp generator generates a multibit time stamp value including a predetermined number of least significant bits overlapping a predetermined number of most significant bits. Each client receives the least significant bits. Each client associates captured data with a corresponding set of the least significant bits in a message. A central scheduling unit associates most significant bits of the time stamp value with the least significant bits of the message. This associating compares overlap bits of the most significant bits and least significant bits. The most significant bits are decremented until the overlap bits are equal.

6 Claims, 4 Drawing Sheets

COMPARING CENTRAL TIME STAMP BITS FROM BUS AND CLIENT CIRCUITRY

CLAIM OF PRIORITY

This application is a Divisional of prior application Ser. No. 12/973,274, filed Dec. 20, 2010, now abandoned;

And also claims priority under 35 U.S.C. 119(e)(1) to U.S. Provisional Application No. 61/287,951 filed Dec. 18, 2009.

TECHNICAL FIELD OF THE INVENTION

The technical field of this invention is time stamping for emulation and debug of electronic systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration in accordance with the prior art. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates a prior art emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

Instrumentation data is collected and reported from all parts of the chip embodying the electronic system. This instrumentation data is sometimes sent to a central location to be time stamped. This may cause problems when the precise time an event occurred is required. Recording the time stamp at the central location may not be accurate as it is affected by a number of factors that cause an error in the timestamp

SUMMARY OF THE INVENTION

This invention is time stamping subsystem of an electronic apparatus. A time stamp generator generates a multibit time stamp value. A first data bus transmits a predetermined number of least significant bits of the time stamp value. A second data bus transmits a predetermined number of most significant bits of the time stamp value. The least significant bits and the most significant bits are overlapping. Each client receives the least significant bits. Each client associates captured data with a corresponding set of the least significant bits in a message. A central scheduling unit associates most significant bits of the time stamp value with the least significant bits of the message. This associating compares overlap bits of the most significant bits and least significant bits. The most significant bits are decremented until the overlap bits are equal.

The invention reduces chip route area in critical routings and minimizes instrumentation output volume.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
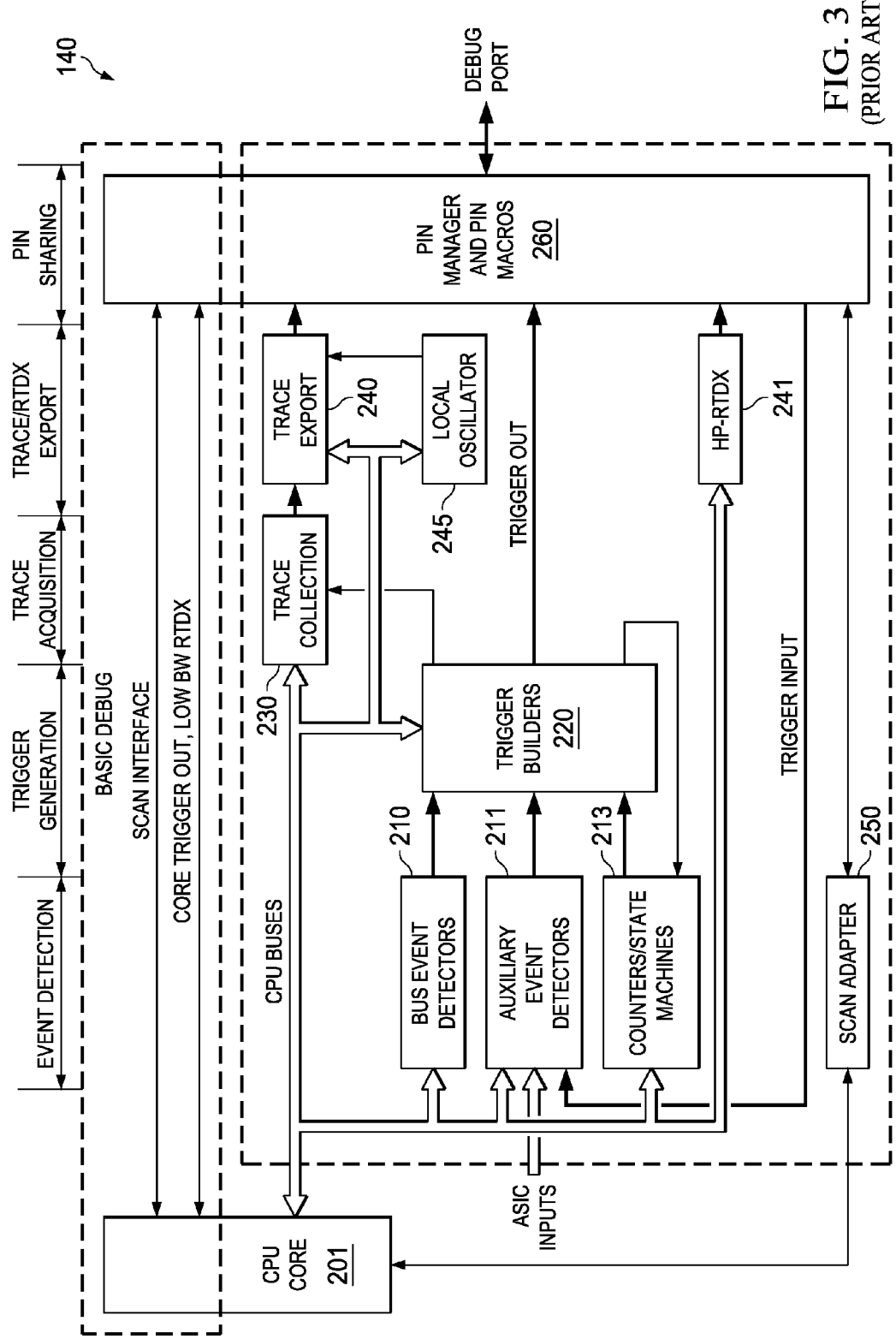
FIG. 3 illustrates in block diagram form a typical integrated circuit employing configurable emulation capability of the prior art.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245.

Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

In a system where emulation or debug is desired, it is often desirable to collect information about system operation using hardware monitors. This information becomes even more valuable when the precise time at which the information is collected is also recorded and available as part of the information. The time at which information is collected is called a timestamp. Many times this information is sent via a bus to a common destination for scheduling, timestamping and output.

One method of timestamping presumes a common time base is available to all functions (timestamp clients) generating a timestamp. As the operating frequency of systems increase, the number of bits used for a time stamp generally increase proportionally. If each timestamp source were to include a complete timestamp with its collected information, a large volume of data would be created. It is more advantageous to minimize the information volume generated. This invention is related to minimizing this information volume.

Figure 4:
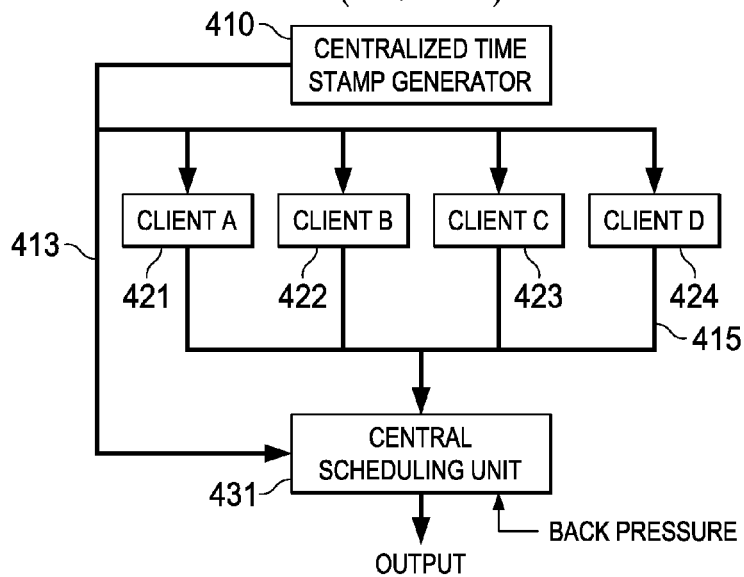
FIG. 4 illustrates a prior art technique for distribution of time stamp values to clients.

FIG. 4 illustrates a prior art technique for distributing timestamp information. Centralized time stamp generator 410 generates a multibit time stamp value which it transmits on bus 413. Bus 413 supplies this time stamp value to clients 421, 422, 423 and 424, and to central scheduling unit 431. Note FIG. 4 illustrates 4 clients as an example only. An actual embodiment may have more or fewer clients.

Figure 1:
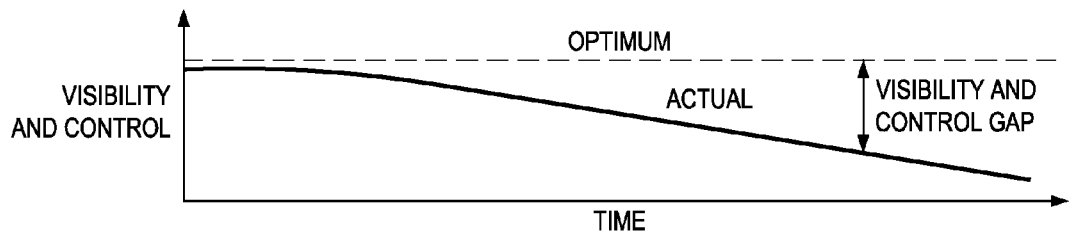
FIG. 1 illustrates the visibility and control of typical integrated circuits as a function of time due to increasing system integration.
Figure 2:
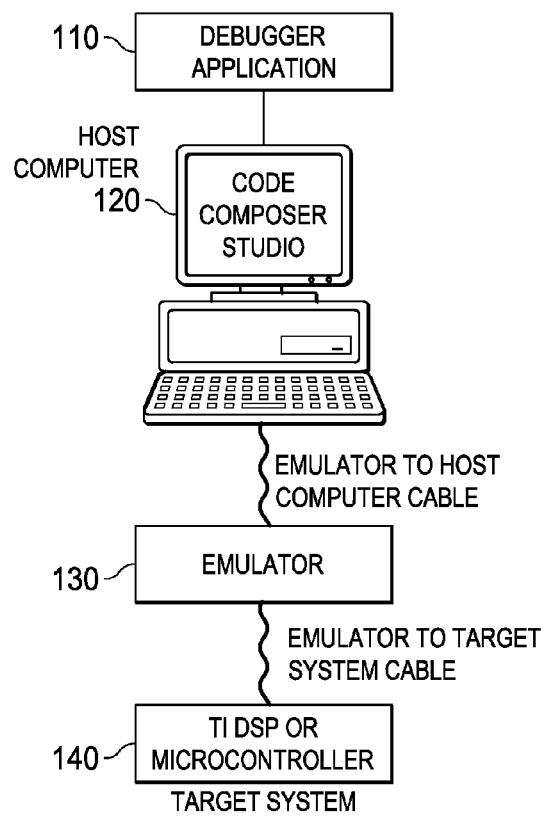
FIG. 2 illustrates a prior art emulation system to which this invention is applicable.

Clients 421, 422, 423 and 424 capture emulation or debug data as known in the art as described in conjunction with FIGS. 1 to 3. Upon capture of this emulation or debug data the client 421, 422, 423 or 424 associates the captured data with a time indicated by a current time stamp value received on bus 413. Following each data capture the capturing client 421, 422, 423 or 424 supplies the associated emulation or debug data and time stamp value to central scheduling unit 431 via bus 415.

Central scheduling unit 431 serves as the gathering point for all emulation or debug data with associated time stamp value. Central scheduling unit 431 outputs this data via the output to an external device such as emulation controller 130. Output from central scheduling unit 431 is subject to back pressure such as when the receiving external device is not ready for more data. Central scheduling unit 431 also receives the time stamp value from bus 413 and may attach this directly received time stamp value to other data from clients 421, 422, 423 and 424 in appropriate circumstances. A number of conditions at central scheduling unit 431 such as bus arbitration or back pressure can cause the time associated with a message generated by a client 421, 422, 423 or 424 to be inaccurate.

Figure 5:
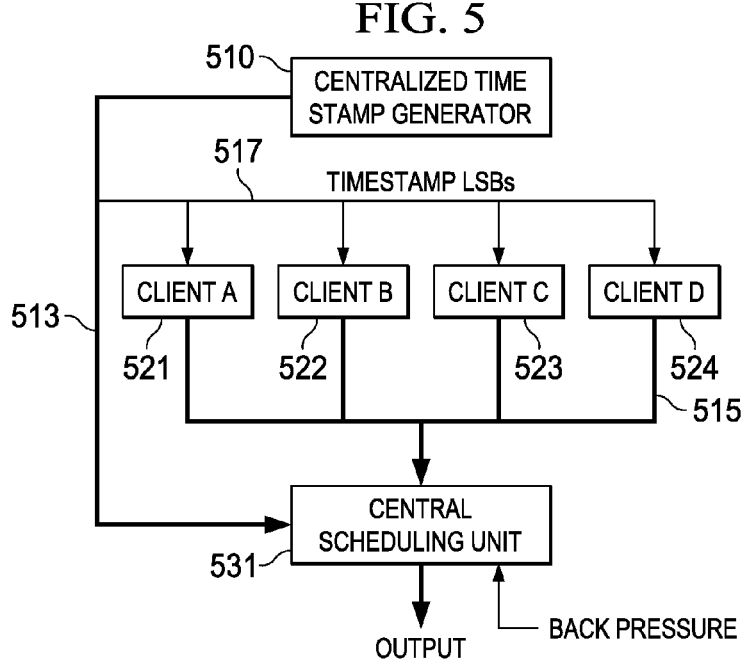
FIG. 5 illustrates a technique for distribution of time stamp values to clients according to one embodiment of this invention.

FIG. 5 illustrates a preferred embodiment of this invention. FIG. 5 is similar to FIG. 4 in including centralized time stamp generator 510, clients 521, 522, 523 and 524, and central scheduling unit 531. Centralized time stamp generator 510 outputs the multibit time stamp value on bus 513 which supplies the whole time stamp value to central scheduling unit 531. Bus 513 need not include all bits of the time stamp value but only a predetermined number of the most significant bits (MSBs). A smaller bus 517 carrying only a predetermined number of least significant bits (LSBs) of the time stamp value supplies clients 521, 522, 523 and 524.

Clients 521, 522, 523 and 524 capture emulation or debug data and associate this captured data with a time indicated by a current time stamp value LSBs received on bus 517. Following each data capture the capturing client 521, 522, 523 or 524 supplies the associated emulation or debug data and time stamp value LSBs to central scheduling unit 531 via bus 515. Central scheduling unit 531 operates as central scheduling unit 431 with the additional function of matching the time stamp value LSBs received from one of clients 521, 522, 523 or 524 via bus 515 with the whole time stamp value received from bus 513. Thus central scheduling unit 531 includes the MSBs of the timestamp value with the message content received from one of clients 521, 522, 523 or 524 via bus 515. Thus central scheduling unit 531 outputs each message with a complete timestamp. This technique minimizes the amount of hardware needed in client to generate precise timestamps of an identified event.

In the prior art illustrated in FIG. 4 each client includes the entire time stamp value within the message describing the captured information sent to central scheduling unit 431. In this invention illustrated in FIG. 5 each client needs only to provide a number of LSBs of the timestamp value sufficient to correlate these time stamp LSBs with the whole time stamp separately received at central scheduling unit 531. This reduces the number of bits of the time stamp value transmitted to each client and from each client to the central scheduling unit 531 reducing the needed integrated circuit area needed for the routing.

Central scheduling unit 531 must correctly associate the time stamp LSBs received from a client with the separately received whole time stamp value. There are a number of reasons why this association may be difficult. Central scheduling unit 531 and the client may be operating in different clock domains. Central scheduling unit 531 and/or the client may be operating in a different clock domain than centralized time stamp generator 510. There could be different analog delays between the path from centralized time stamp generator 510 to central scheduling unit 531 and the path from centralized time stamp generator 510 to central scheduling unit 531 via the client.

Figure 6:
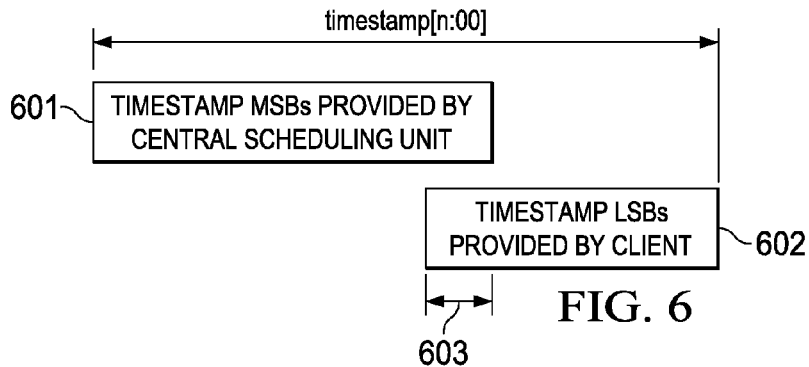
FIG. 6 illustrates schematically how the central scheduling unit may assemble a complete time stamp value when using the embodiment illustrated in FIG. 5.

FIG. 6 illustrates a technique to correlate the time stamp received by central scheduling unit 531 directly from centralized time stamp generator 510 via bus 513 and the time stamp LSBs received from the client via bus 515. The MSBs of the time stamp value on bus 513 has at least some bits that overlap with the LSBs of the time stamp value forwarded to central scheduling unit 531 from the client. FIG. 6 illustrates the time stamp MSBs 601 from centralized time stamp generator 510 sharing overlap bits 603 with the time stamp LSBs 602 from the client. This technique assumes that the elapsed time from when the time stamp LSBs are captured to when central scheduling unit 531 processes the message is less than the time it takes for the time stamp LSBs to rollover and wrap around. The time stamp for the client recorded event is created by correlating the time stamp MSBs provided by the Central Scheduling Unit and the time stamp LSBs provided by the Client as shown in FIG. 2.

Figure 7:
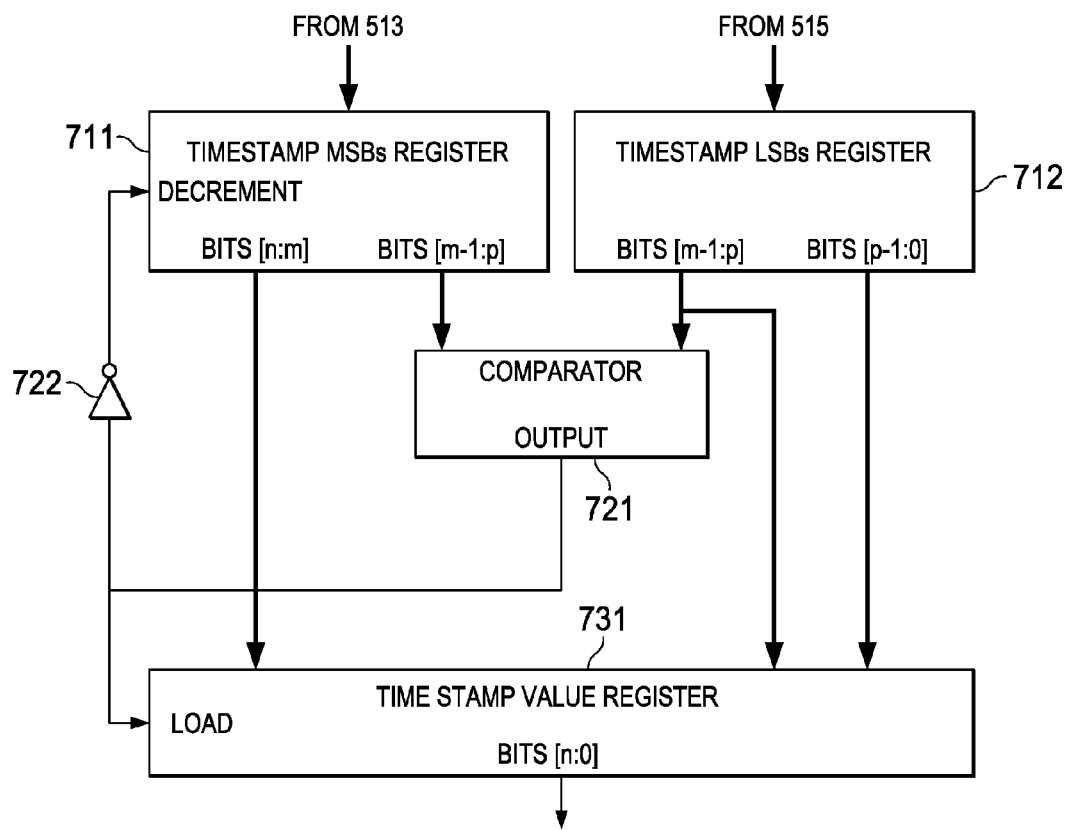
FIG. 7 illustrates hardware to implement the method of FIG. 6.

FIG. 7 illustrates hardware to implement the method of FIG. 6. Time stamp MSBs register 711 receives the most significant bits of the time stamp value from bus 513. FIG. 7 illustrates time stamp MSBs register 711 storing only bits to bit p which is the least significant overlap bit. Time stamp MSBs register 711 may store all bits of the time stamp value from bus 513. Bits less significant than the least significant overlap bit p are not used in FIG. 7 and need not be stored in time stamp MSBs register 711. Time stamp LSBs register 712 receives the least significant bits such as transmitted by bus 517 from bus 515. As described above bus 515 includes the associated emulation or debug data. This data is not used in FIG. 7 and need not be stored in time stamp LSBs register 712. Both time stamp MSBs register 711 and time stamp LSBs register 712 are loaded when a message is received by central scheduling unit 513 from one of the client 521, 522, 523 and 524.

FIG. 7 anticipates that the time stamp LSBs from the client are delayed relative to the time stamp MSBs received directly from centralized time stamp generator 510. Comparator 721 receives the overlap bits [m−1:p] from both time stamp MSBs register 711 and time stamp LSBs register 712. The output from comparator 721 has a first state indicating the inputs are unequal and a second state indicating the inputs are equal. When the output signal indicates the inputs are not equal, inverter 722 supplies an active input to a decrement input of time stamp MSBs register 711. Time stamp MSBs register 711 decrements the data stored therein in response to this active decrement signal. When the output signal indicates the inputs are not equal, the load input to time stamp value register 731 is inactive. Thus time stamp value register 731 does not load data.

Decrementing time stamp MSBs register 711 will eventually cause the overlap bits to be equal. When the output signal indicates the inputs are equal, inverter 722 supplies an inactive input to a decrement input of time stamp MSBs register 711. Time stamp MSBs register 711 thus stops decrementing. When the output signal indicates the inputs are equal, the load input to time stamp value register 731 is active. Thus time stamp value register 731 loads data from time stamp MSBs register 711 and time stamp LSBs register 712 of the whole, reconciled time stamp value. Because comparator 721 ensures that the overlap bits are equal, the overlap data input to time stamp value register 731 could come from either time stamp value MSBs register 711 or from time stamp value LSBs register 712. FIG. 7 illustrates this overlap data is supplied by or from time stamp value LSBs register 712. Central scheduling unit 531 associates this time stamp value with the corresponding emulation or debug data for later use, such as by emulator 130.

What is claimed is:

1. An integrated circuit comprising:
   A. functional circuitry having functional leads;
   B. time stamp generator circuitry having time stamp bit leads, the time stamp bit leads including a group of most significant bit leads carrying most significant bits, a group of least significant bit leads carrying least significant bits, and a group of central bit leads, that carry central bits, that include some of the most significant bit leads and some of the least significant bit leads;
   C. a first bus of time stamp bit leads connected to the time stamp bit leads of the time stamp generator circuitry, the first bus including the most significant bit leads and the central bit leads;
   D. a second bus of time stamp bit leads connected to the time stamp bit leads of the time stamp generator circuitry, the second bus including the least significant bit leads and the central bit leads;
   E. client circuitry that has functional inputs coupled to the functional leads, time stamp inputs connected to only the second bus, the client circuitry including data circuitry capturing data from the functional leads with time stamp data from the time stamp inputs, and the client circuitry having scheduling outputs that output the captured data with time stamp data; and
   F. scheduling circuitry having time stamp inputs connected to only the first bus and client inputs connected to the scheduling outputs, the scheduling circuitry including comparator circuitry having first inputs coupled to the central bits from the first bus and second inputs coupled to the central bits from the scheduling outputs to determine a full time stamp of the captured data.

2. The integrated circuit of claim 1 in which the functional circuitry includes a central processing unit.

3. The integrated circuit of claim 1 in which the time stamp bit leads of the time stamp generator circuitry are numbered from n to 0, the most significant bit leads are numbered from n to m and m−1 to p, the central bit leads are numbered from m−1 to p, and the least significant bit leads are numbered from m−1 to p and p−1 to 0.

4. The integrated circuit of claim 1 in which the client circuitry includes plural client circuits.

5. The integrated circuit of claim 1 in which the client circuitry includes at least one of emulation circuitry and debug circuitry.

6. The integrated circuit of claim 1 in which the client circuitry includes at least one of bus event detectors, trigger builders, trace collection circuitry, data export circuitry, and scan adaptor circuitry.

* * * * *